United States Patent [19]

Welch et al.

[11] Patent Number: 5,330,298

[45] Date of Patent: Jul. 19, 1994

[54] MILLING MACHINE ACCESSORY PROVIDING AUTOMATIC AND MANUAL QUILL CONTROL

[75] Inventors: Gary A. Welch, Chanhassen; Timothy L. Rashleger, Tonka Bay, both of Minn.

[73] Assignee: IIC, Inc., Chanhassen, Minn.

[21] Appl. No.: 40,674

[22] Filed: Mar. 31, 1993

[51] Int. Cl.⁵ .......................... B23C 1/16; B23B 39/00
[52] U.S. Cl. ...................................... 409/80; 408/129; 408/136; 409/185
[58] Field of Search ............... 409/185, 190, 191, 201, 409/204, 203, 196, 80, 183; 408/129, 136

[56] References Cited

U.S. PATENT DOCUMENTS

| | | | |
|---|---|---|---|
| 2,891,426 | 6/1959 | Martin et al. | 408/129 X |
| 2,902,891 | 9/1959 | Wollenhaupt | 408/136 X |
| 3,064,540 | 11/1962 | Frushour et al. | 409/185 |
| 3,806,691 | 4/1974 | Roach | 409/185 X |
| 4,358,228 | 11/1982 | Stark | 408/129 X |
| 4,674,928 | 6/1987 | Lyman | 409/80 |

FOREIGN PATENT DOCUMENTS

| | | | |
|---|---|---|---|
| 271614 | 11/1986 | Japan | 408/136 |
| 2127332 | 4/1984 | United Kingdom | 409/191 |

*Primary Examiner*—William Briggs
*Attorney, Agent, or Firm*—Westman, Champlin & Kelly

[57] ABSTRACT

A milling machine has a lower frame portion with a saddle and a table coupled to the lower frame portion by a knee. The milling machine also has a head with a quill and spindle. The table provides movement of a workpiece relative to the spindle along a first axis. The saddle provides movement of the workpiece relative to the spindle along a second axis. A manual controller provides manual control of the quill. An automatic controller provides automatic control of the quill. The automatic controller and the manual controller are cooperable so that the quill can be manually and automatically controlled.

19 Claims, 4 Drawing Sheets

MILLING MACHINE ACCESSORY PROVIDING AUTOMATIC AND MANUAL QUILL CONTROL

BACKGROUND OF THE INVENTION

The present invention deals with milling machines. More particularly, the present invention deals with a milling machine accessory providing both automatic and manual control for a quill of a milling machine.

Milling machines commonly used by operators for milling items, such as metal, take several forms. Typical milling machines are found in many tool rooms, mold shops, U.S. government facilities, and many other type of facilities. These common milling machines are manufactured by many companies worldwide. One commonly known milling machine is referred to as a knee mill. A typical knee mill has several major components. One component is a base portion which supports a knee, saddle and a table. The table is mounted on the saddle and the saddle is mounted on the knee. The workpiece rests on, or is fastened to the table during milling. The table is operable to move the workpiece along a first axis of movement generally adjacent the knee mill base.

The saddle is connected to the knee portion and supports the table. The saddle is operable to move the table, and consequently the workpiece, along a second axis of movement which is perpendicular to the first axis of movement. The second axis is defined along a line extending generally into and away from the milling machine. The first and second axes of movement are commonly referred to as the X and Y axes.

Another portion of a typical milling machine is referred to as a ram. The ram extends outwardly from the base portion and is used to support another major component of the milling machine, the head assembly.

The head assembly includes a spindle and a quill. The spindle holds a milling tool used for milling the workpiece. The head assembly also includes a spindle motor for causing the spindle to rotate within the quill. The quill is movable along a third axis of movement which is perpendicular to the first and second axes of movement. The third axis of movement is generally defined by a vertical line extending in both directions through the center of the spindle. The third axis is commonly referred to as the Z axis.

Prior milling machines have been operated in substantially three modes. The modes include manual operation, two axis operation and three axis operation.

In the manual mode, the milling machine is provided with manually operated devices to accomplish movement along the three axes of motion. In other words, the milling machine is provided with mechanical handles or cranks coupled to screws to move the appropriate portion of the milling machine along the corresponding axis of motion. The table is provided with a hand crank attached to a screw to move the table along the first axis of motion. Similarly, the saddle is provided with a handle connected to a screw to move the table along the second axis of motion. Also, the quill is coupled to a mechanical lever arm or handle which, when rotated, moves the quill up and down along the third axis of motion. In this way, the workpiece can be manually moved relative to the rotating spindle within the quill to an appropriate location for desired machining.

In order to manually position the workpiece with the hand cranks, the operator manually turns the X or Y crank to desirably position the workpiece with respect to the tool along two axes of movement. The operator tracks the movement via position indicating dials, electronic readouts, or other similar means.

Past milling machines have also been operated as two or three axis automatic machines. In two or three axes CNC milling machines, automatic positioning is provided along either two or three axes of motion. Machines which have been made to position the table and saddle automatically are referred to as two axis automatic machines. In two axis automatic machines, servo motors are coupled to the table and saddle screws for driving the table and saddle into position. The servo motors are coupled to a computer or other type of automatic motor controller. The computer receives position information from an operator, or from a stored program, and controls the servo motor to automatically position the machine along the axes of motion to a desired position based upon the position information received. In such a system, movement of the quill along the third axis, or z axis, is typically left to be manually operated.

In two axis milling machines, the table and saddle are automatically positioned using the computer controlled servo system discussed in the previous paragraph. In a three axis machine, however, movement of the quill along the third axis is also automated. This type of machine is referred to as a three axis Numerically Controlled (NC) or Computerized Numerically Controlled (CNC) milling machine.

Automation of the quill in three axis machines has typically taken one of three forms. First, a servo motor is attached to a ball screw which is, in turn, attached to an exposed portion of the quill on the head assembly. The servo motor controlled by the computer provides automatic positioning of the quill. However, connection of the ball screw to the quill substantially interferes with, or destroys, the ability of an operator to operate the quill manually.

In a second method of quill automation in three axis machines, a gear box is physically installed on the manual quill lever arm. A servo motor is coupled to drive the gear box to rotate the quill lever arm. The servo motor, in turn, is connected to a computer to provide automatic quill movement. However, having the gear box physically mounted to the quill handle also substantially interferes with, or destroys, the ability to manually operate the quill.

In a third method of quill automation in a three axis machine, a servo motor is coupled to a small hand crank on the head assembly which is, in turn, coupled to the quill. The servo motor is coupled to a computer to provide automatic quill positioning. This method also substantially interferes with, or destroys, the ability to provide manual operation of the quill.

SUMMARY OF THE INVENTION

The present invention arises from the recognition that both manual and automatic positioning of the quill are desirable features. Therefore, there is a need for a milling machine which provides automatic positioning of the quill without destroying, or substantially interfering with, manual positioning of the quill.

The milling machine has a lower frame portion with a saddle and table coupled to the lower frame portion. The milling machine also includes a head which includes a quill and spindle. The table provides movement of the workpiece relative to the spindle along a first axis, and the saddle provides movement of the workpiece relative to the spindle along a second axis. Manual control means are coupled to the head for providing manual control of the quill. Automatic control means are also coupled to the head for providing automatic control of the quill. The automatic control means and the manual control means are cooperable so that the quill position can be manually and automatically controlled.

DETAILED DESCRIPTION OF THE PREFERRED EMBODIMENTS

Figure 1:
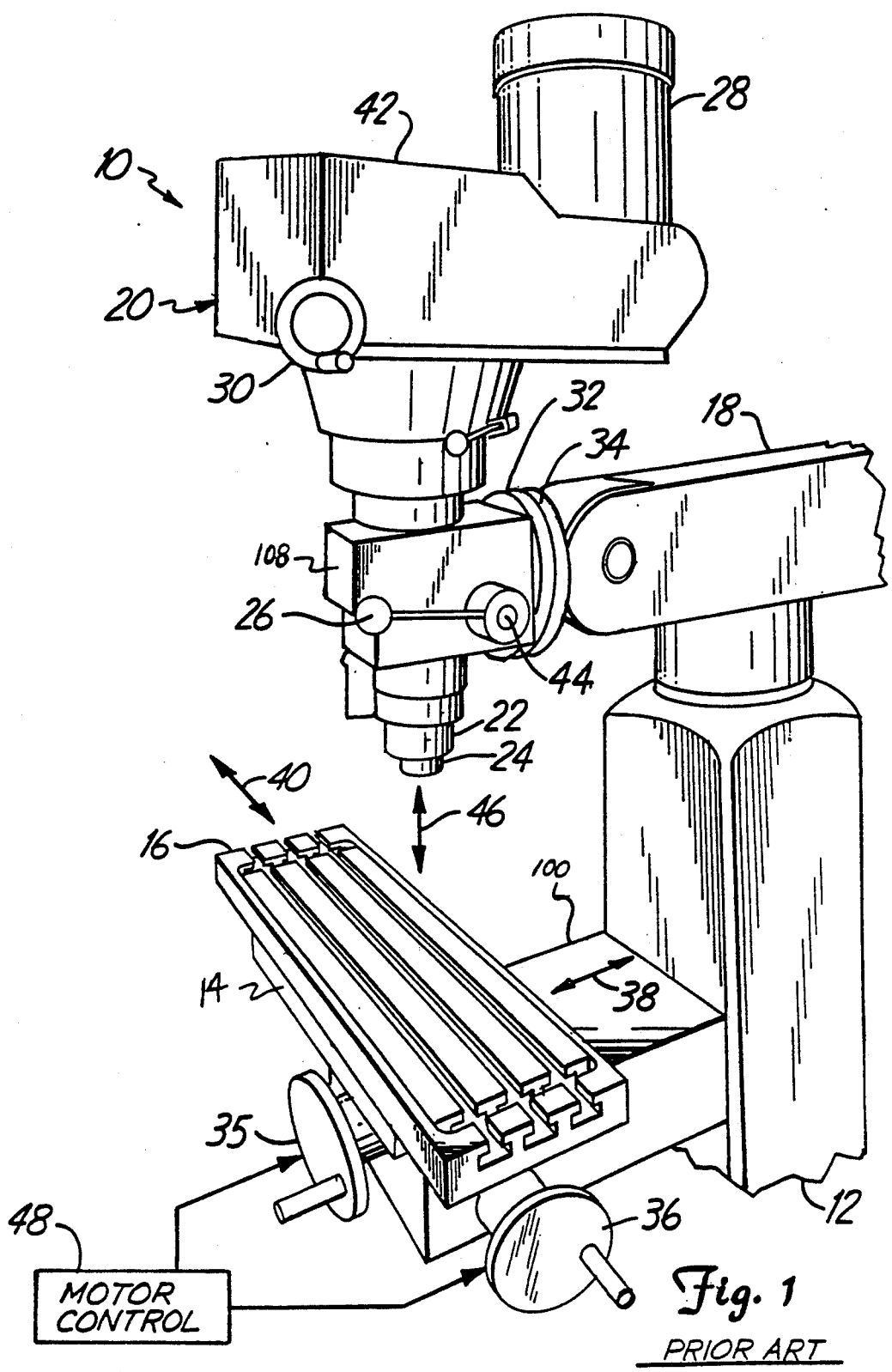
FIG. 1 is a perspective view of a prior art milling machine.

FIG. 1 is a perspective view of a prior art milling machine 10. Milling machine 10 includes base and column portion 12, saddle 14, table 16, ram 18, head assembly 20, and knee 100. Milling machine 10 is used to mill or drill a workpiece, such as a piece of metal. The workpiece rests on, or is fastened to, table 16.

Head assembly 20 includes quill 22 spindle 24, quill positioning lever 26, motor 28, quill body 108, and pulley ratio adjustment lever 30. Head assembly 20 is mounted to ram 18 by bolts which hold machine surfaces 32 and 34 adjacent one another.

Knee 100 includes hand crank 35. Hand crank 35 is commonly attached to a knee mounted ball screw with the nut of the ball screw attached to saddle 14. When an operator turns hand crank 35, table 16 and saddle 14 move along an axis of movement 38 also known as the Y axis.

Table 16 includes hand crank 36. Hand crank 36 is commonly coupled to a ball screw which is mounted in table 16 with its nut attached to saddle 14. As an operator turns hand crank 36, table 16 moves along axis of movement 40 also known as the X axis.

In operation, a tool (not shown) is inserted within spindle 24. Motor 28 is then turned on. Motor 28 is commonly an AC motor which is coupled to spindle 24 by a system of pulleys and belts in housing 42. Thus, as motor 28 turns, it drives rotation of spindle 24 (and consequently the tool mounted in spindle 24) within quill 22.

Pulley ratio adjustment crank 30 is commonly provided to adjust a variable pitch pulley within pulley housing 42 of head assembly 20. This adjusts the rate of rotation of spindle 24 within quill 22 without changing the rate of rotation of motor 28.

The operator then positions a workpiece on table 16 at a desired position relative to the tool mounted in spindle 24. The operator positions the workpiece by turning hand cranks 35 and 36 so that table 16 moves along axes of movement 38 and 40 to a desired position relative to spindle 24. Once the workpiece is adequately positioned beneath the tool in spindle 24, the operator is then ready to actually mill or drill the workpiece with the tool. Therefore, the operator rotates manual adjustment lever 26 about axis of rotation 44. Rotating lever 26 causes quill 22 to move vertically downward along axis of movement 46. This causes the tool mounted within spindle 24 to contact and mill the workpiece on table 16. The quill 22 and spindle 24 move downward along axis 46 as a single piece, with spindle 24 rotating within quill 22.

In the past, movement of components of milling machine 10 along axis 38 and 40 or along all three axes of motion 38, 40, and 46, has been automated. In two axis machines, servo motors are mounted to provide rotation of the ball screws associated with hand cranks 35 and 36. The servo motors are controlled by an electronic motor controller. The servo motors and the motor controller are represented in FIG. 1 by motor control box 48. The servo motors, controlled by the motor controller, cause rotation of the ball screws to position table 16 based on position information received by the motor controller.

In other prior embodiments, movement of the quill 22 along axis 46 is also automated. This has been done in the past by attaching a servo motor and a screw directly to quill 22. Rotation of the servo motor causes the screw to position quill 22 along axis 46.

In a second prior embodiment, positioning of quill 22 is automated by installing a gear box, rotated by a servo motor, on the manual positioning lever 26. Rotation of the servo motor causes rotation of the manual positioning lever to position quill 22 along axis 46.

In a final prior embodiment for automated positioning of quill 22, a servo motor is installed adjacent a small hand crank (not shown in FIG. 1) which is also coupled for positioning of quill 22. Rotation of the servo motor causes rotation of the hand crank thereby positioning quill 22 along axis 46.

Each of these three methods of automating movement of quill 22 along axis 46 encumbered quill handle 26. The encumbrance destroyed, or substantially interfered with, the ability of an operator to manually position quill 22 along axis 46. This can be very disadvantageous in certain applications in which manual operation of quill 22 is desirable.

Figure 2:
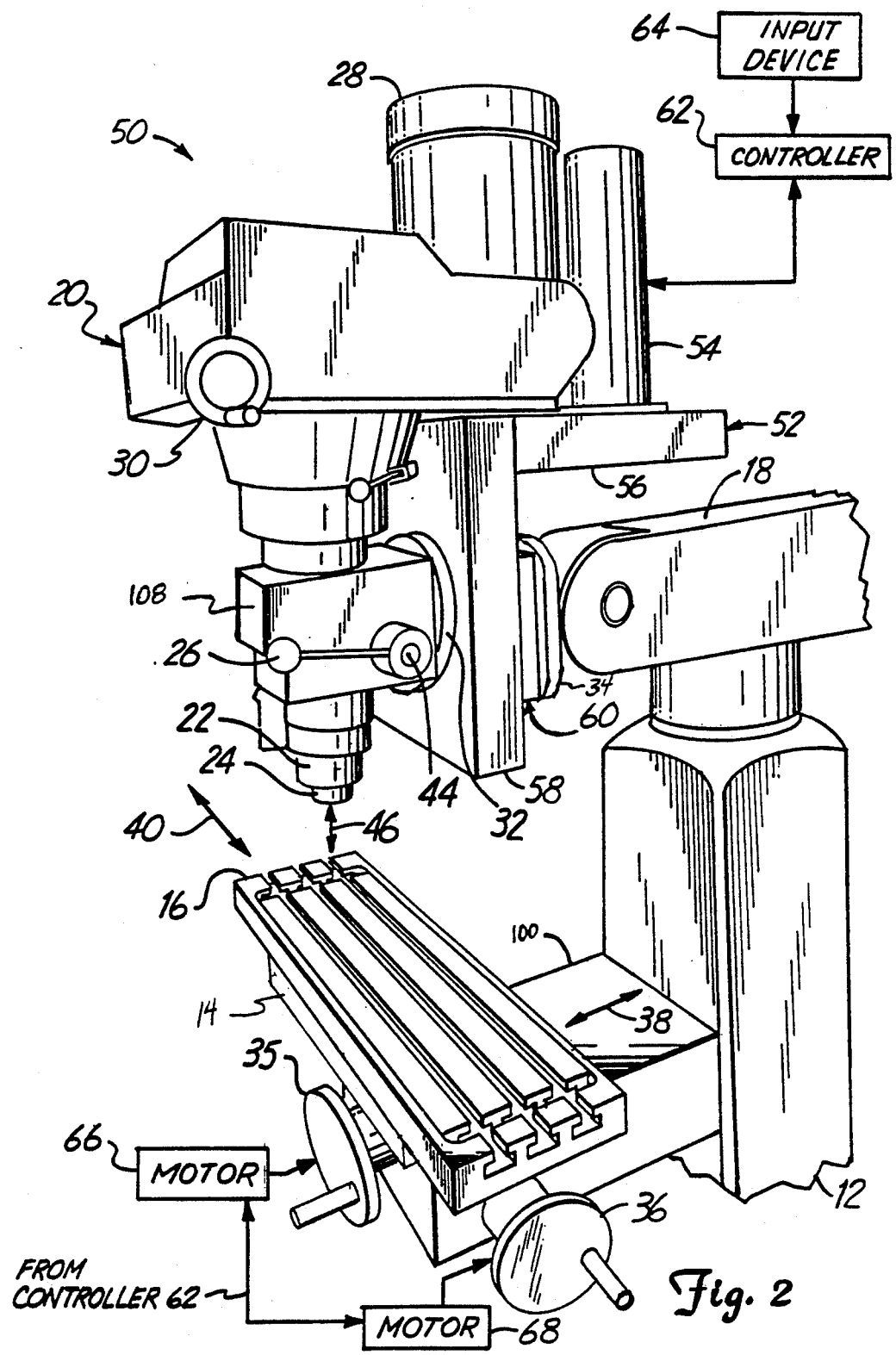
FIG. 2 is a perspective view of a milling machine according to the present invention.

FIG. 2 is a perspective view of milling machine 50 of the present invention. Milling machine 50 includes many of the same features as milling machine 10 shown in FIG. 1, and corresponding features are similarly numbered. However, milling machine 50 also includes mounting assembly 52 of the present invention. Mounting assembly 52 movably mounts head assembly 20 to ram 18 of milling machine 50. Mounting assembly 52 includes motor 54, pulley housing 56, ball screw housing 58, and slide assembly 60. Slide assembly 60 is preferrably entirely located within housing 58. However, for the sake of clarity, slide assembly 60 is shown protruding from housing 58 in FIG. 2. A controller 62, such as a digital computer, is attached to motor 54. Controller 62 is, in turn, coupled to an input device 64 such as a CRT, a keypad, or a keyboard.

Mounting assembly 52 mounts head assembly 20 in movable relation to ram 18. Motor 54, in this preferred embodiment, is a servo motor. Motor 54 also preferrably includes a brake so that when milling machine 50 is only manually operated, head assembly 20 does not move relative to ram 18. Motor 54 is attached, via pulleys located in pulley housing 52, to a ball screw located in ball screw housing 58. As servo motor 54 rotates, the pulleys cause the ball screw in ball screw housing 58 to rotate. This causes movement of the entire head assembly 20 with respect to ram 18. This results in movement of quill 22 and spindle 24 along axis 46. This movement is preferrably fully automated by simply entering position information into controller 62 either directly through input device 64, or through an application program stored in controller 62. Controller 62 controls motor 54 to rotate so that the tool in spindle 24 is accurately positioned relative to the workpiece on table 16 based on the input information received at controller 62.

By providing movement of the entire head assembly 20 relative to ram 18 (and consequently table 16), movement of the spindle along axis 46 is automated without compromising the integrity of the manual positioning lever 26. There is no encumbrance, whatsoever, on either manual positioning lever 26 or on the quill 22. Thus, milling machine 50 can accomplish movement of quill 22 along axis 46 either manually or automatically, or both, without any physical modifications or changes to milling machine 50. Therefore, milling machine 50 provides a significant advantage over prior milling machines.

Milling machine 50 also provides another advantage over prior milling machines. A machine which relies on movement along axis 46 solely through movement of quill 22 within head assembly 20 has a limited range of movement. Quills in typical, commercially available, milling machines have vertical movement along axis 46 of approximately five inches. Mounting assembly 52 of the present invention provides essentially any desired range of movement along axis 46. In the preferred embodiment, mounting assembly 52 provides approximately seven inches of movement along axis 46. Since quill 22 can also be moved along axis 46 manually, milling machine 50 has a range of 12 inches of movement along axis 46, as compared to five inches for previous milling machines.

As with milling machine 10 shown in FIG. 1, motors can be provided to milling machine 50 to automate movement along axes 38 and 40. Where motors 66 and 68 are provided instead of hand cranks 35 and 36, milling machine 50 can be used as either a two axis milling machine (with quill 22 being manually operated) or a three axis milling machine, (with quill 22 being automatically operated) or both (with quill 22 being automatically and manually operated). Further, motors 66 and 68 preferably receive a motor controller input from controller 62 so that positioning of milling machine 50 along all three axes of movement is controlled by controller 62.

Figure 3:
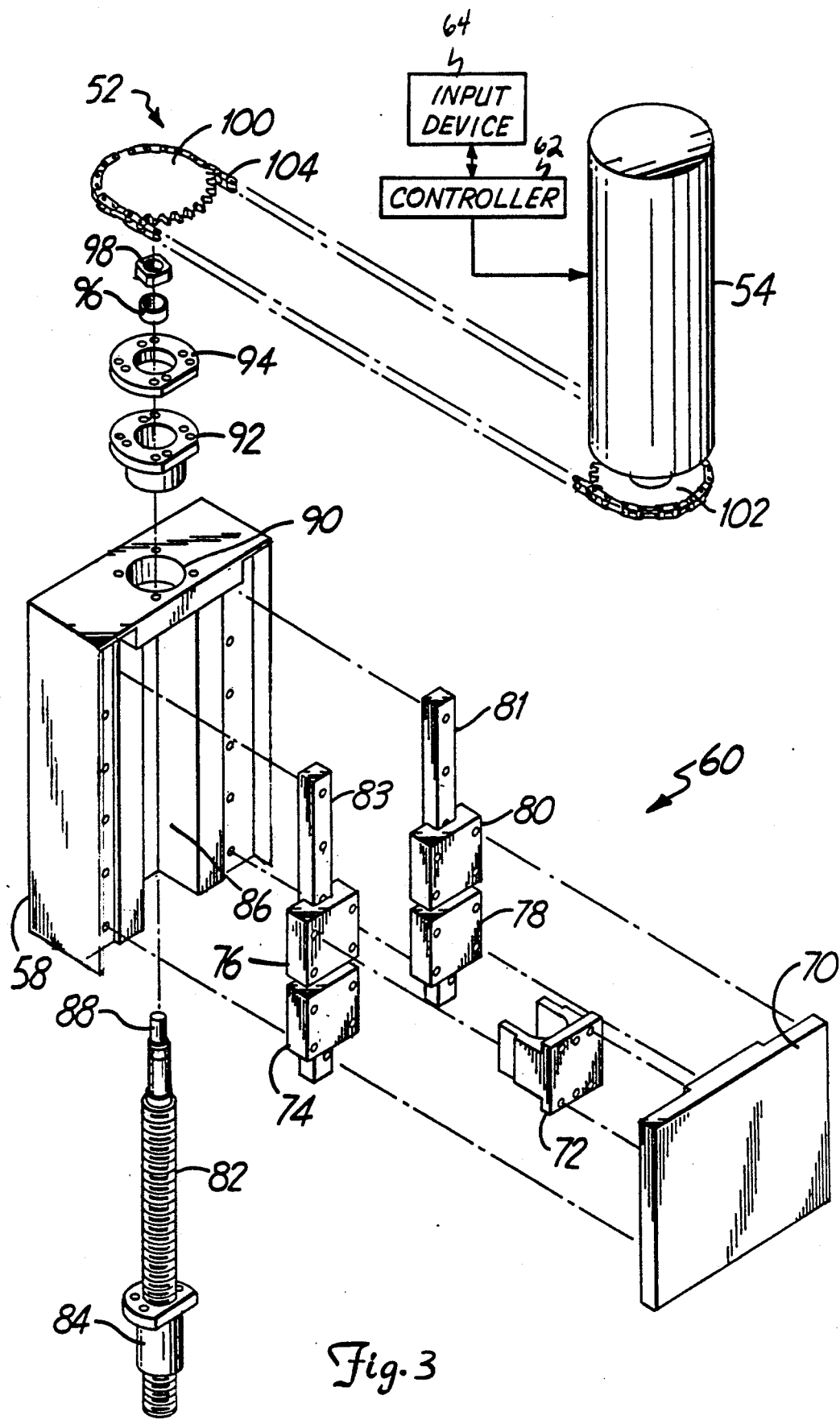
FIG. 3 is an exploded view of a mounting assembly of the present invention.

FIG. 3 is an exploded view of mounting assembly 52 with pulley housing 56 removed. Mounting assembly 52 includes mounting plate 70 which is rigidly attached to surface 34 on ram 18. Ball screw nut yoke 72 is rigidly attached to mounting plate 70. In addition, bearing blocks 74, 76, 78 and 80 are also rigidly attached to mounting plate 70. Bearing ways 81 and 83 are rigidly attached to ball screw housing 58. When bearing ways 81 and 83 are rigidly attached to slide housing 58, bearing blocks 74–80, along with ball nut yoke 72 and mounting plate 70, are positioned adjacent one another so that bearing ways 81 and 83 slide within bearing blocks 74–80. Bearing ways 81 and 83 fit extremely tight within bearing blocks 74, 76, 78 and 80. This tight fit offers the rigidity needed to effectively control the tool in spindle 24.

Ball screw 82 and ball screw nut 84 are placed within a recess 86 in ball screw housing 58. A first end 88 of ball screw 82 is inserted through an aperture 90 in an upper end of ball screw housing 58. A shoulder mounting sleeve 92 is positioned within aperture 90 and rests against the upper end of ball screw housing 58. Spacer 94 is mounted adjacent mounting sleave 92. Bearing member 96 and frictional fitting member 98 are positioned over the upper end 88 of ball screw 82 and are fit against upper end 88. Member 98 is also rigidly coupled to pulley wheel 100 which is coupled to pulley wheel 102 by timing belt 104. Pulley wheel 102 is, in turn, driven by motor 54.

As motor 54 rotates, pulley wheel 102 drives pulley wheel 100 via timing belt 104. Pulley wheel 100, which is rigidly attached to the upper end 88 of ball screw 82, causes ball screw 82 to rotate within ball nut 84. Ball nut 84 is rigidly attached to yoke 72. Therefore, rotation of ball screw 82 within ball nut 84 causes ball screw 82 to move vertically up or down relative to ball nut 84, yoke 72, and mounting plate 70. Since upper end 88 of ball screw 82 is also rigidly attached to housing 58, vertical movement of ball screw 82 causes vertical movement of housing 58. Thus, the rotation of motor 54 is translated into vertical, linear movement of housing 58, and consequently head assembly 20, with respect to the ram 18 and base portion 12 of milling machine 50. This causes movement of spindle 24 and quill 22 along axis 46. Ball screw 82 provides a strong and rigid method of providing linear motion to retain the overall integrity of machine 50 and to provide automated positioning along axis 46.

Figure 4:
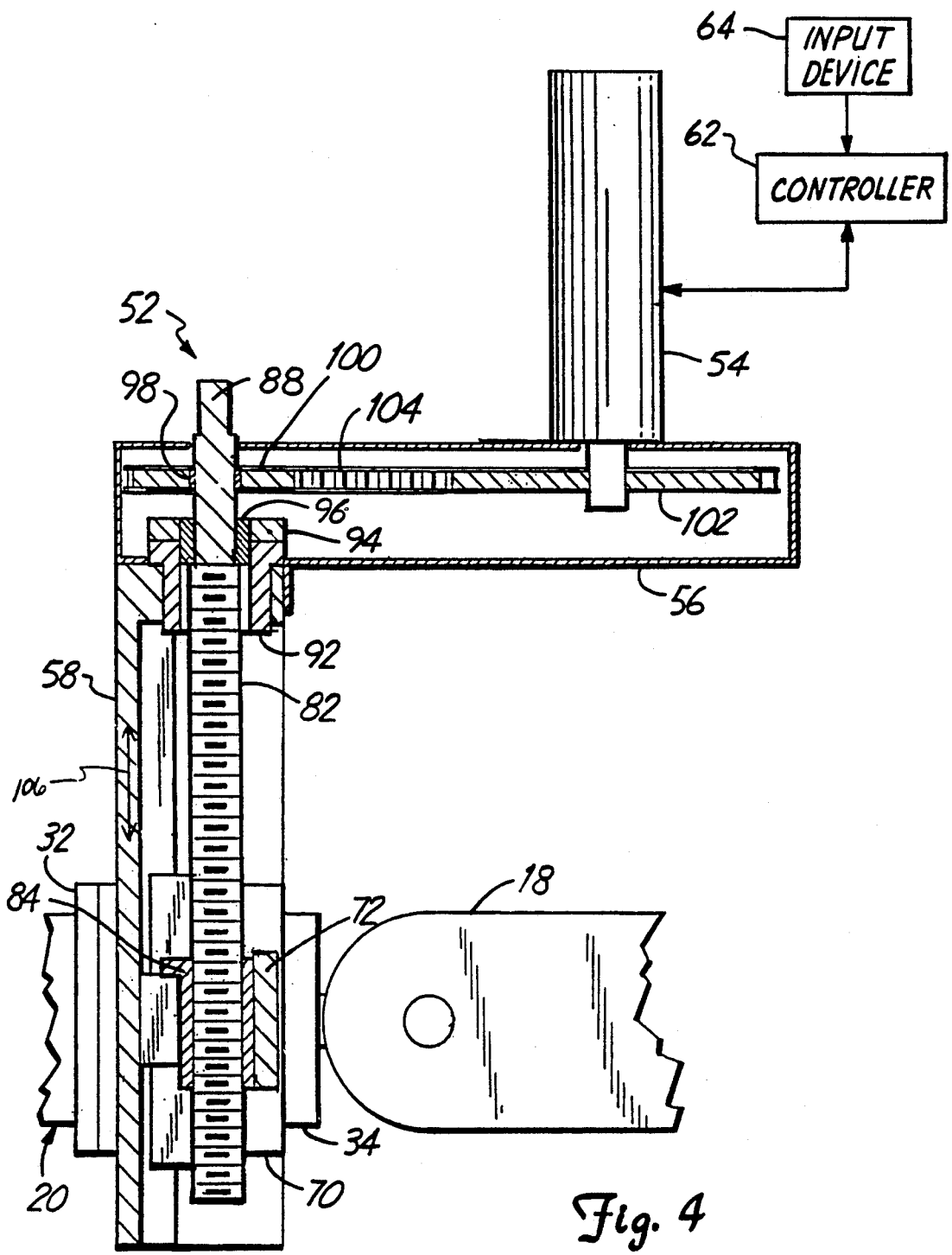
FIG. 4 is a side sectional view of the mounting assembly shown in FIG. 3.

FIG. 4 is a side sectional view of mounting assembly 52. FIG. 4 shows the elements of FIG. 3 assembled.

Controller 62 is preferrably programmed to accept either two axis or three axis position information, depending on whether quill 22 is to be manually or automatically positioned.

During automatic operation, an operator provides position information to controller 62 through input device 64. Controller 62 controls motor 54 to rotate based on the position information received. As motor 54 rotates, it drives pulley wheel 102 to rotate. Pulley wheel 102 causes pulley wheel 100 to rotate via timing belt 104. Since pulley wheel 100 is rigidly attached to upper end 88 of ball screw 82, through member 98, rotation of pulley wheel 100 causes rotation of ball screw 82. Ball screw 82 is rotatably mounted within ball screw housing 58 via bearing member 96. Ball screw nut 84 is rigidly attached to guide 72 which is, in turn, rigidly attached to mounting plate 70. Therefore, as ball screw 82 rotates within nut 84, ball screw 82 moves vertically in the direction indicated by arrow 106, depending on the direction of rotation. As ball screw 82 moves in the direction indicated by arrow 106, it moves the entire ball screw housing 58 and pulley housing 56, as well as motor 54, in the same direction.

Ball screw housing 58 is rigidly attached to surface 32 of head assembly 20. Therefore, rotation of ball screw 82 within nut 84 causes movement of the entire head assembly 20 in the direction indicated by arrow 106. Arrow 106 is parallel to axis of movement 46. Therefore, as ball screw 82 rotates within nut 84, the tool mounted in spindle 24 is also moved along axis of movement 46. Movement of spindle 24 along axis of movement 46 is thus automated by mounting assembly 52 without, in any way, encumbering the manual positioning of quill 22 and spindle 24.

It should be noted that, while bearing blocks 74–80 and bearing ways 81 and 83 have been shown as linear rails or linear bearings, they could also be any suitable type of movable joint such as a dove tail way, or another type of linear bearing. Further, it should be noted that motors 54, 66 and 68 are preferably servo motors, but could also be stepper motors for any other type of suitable motor. Also, while ball screw 82 is driven by motor 54 through the use of timing belts and pulleys, ball screw 82 could also be driven using a gear train or other suitable method. In addition, while ball screw 82 is the preferred method of causing movement of head assembly 20, any suitable method of transferring movement of motor 54 into the desired linear movement can be used. Finally, the bearing ways, ball screw, and servo motor described are all commercially available products.

The present invention is advantageous in its adaptability. In substantially all milling machines of the type being described, the juncture between ram 18 and head assembly 20 is a natural break point. Therefore, mounting assembly 52 of the present invention can be easily retrofit into machines already in the field.

In conclusion, the present invention provides a servo controlled milling machine which can function either as a two-axis or a three-axis machine. Even when functioning as a three-axis machine, automation of the third axis does not interfere with or prevent manual positioning of the quill. By simply programming controller 62, the operator can choose either manual or automatic operation of the Z-axis. This provides a very flexible milling machine. Further, the present invention provides additional range of movement for the quill and spindle along axis 46. Finally, the present invention is adaptable so that it can be easily retrofit into existing milling machines.

Although the present invention has been described with reference to preferred embodiments, workers skilled in the art will recognize that changes may be made in form and detail without departing from the spirit and scope of the invention.

What is claimed is:

1. A milling machine for milling a workpiece, comprising:
    a lower frame and column portion;
    a knee, coupled to the lower frame and column portion;
    a saddle, coupled to the knee portion;
    a table, coupled to the saddle;
    a ram, coupled to the column portion;
    a head coupled to the ram, the head having a quill and a rotatable spindle and means to rotate the spindle, the table providing movement of the workpiece relative to the spindle along a first axis, and the saddle providing movement of the workpiece relative to the spindle along a second axis;
    manual control means, coupled to the head, for providing manual control of the quill and spindle along a third axis; and
    automatic control means, coupled to the head and ram, for providing automatic control of the head, quill, and spindle along the third axis, the automatic control means and the manual control means being independent of one another so that the spindle can be manually and automatically controlled to move along the third axis.

2. A mill comprising:
    a base having a ram;
    a head assembly mounted to the ram, the head assembly having a quill and a rotatable spindle and means to rotate the spindle;
    manual control means, coupled to the quill and spindle, for providing manual positioning control of the quill and spindle; and
    automatic control means, coupled to the head assembly, for providing automatic positioning control of the spindle, the manual control means and the automatic control means being independent of one another so that both are operable simultaneously.

3. The milling machine of claim 1 wherein the automatic control means comprises:
    a controller for receiving position information; and
    a motor, coupled to the controller and the moveable coupling means, the controller controlling the motor based on the position information causing the motor to drive the moveable coupling means to provide relative movement of the head with respect to the lower frame and column portion based on the position information.

4. The milling machine of claim 3 wherein the moveable coupling means comprises:
    a ball screw slide assembly.

5. The milling machine of claim 3 wherein the moveable coupling means comprises:
    a sliding way linear bearing.

6. The milling machine of claim 3 wherein the moveable coupling means comprises:
    a dovetail way linear bearing.

7. The milling machine of claim 3 and further comprising:
    means, coupled to the table and saddle, for providing automatic control of the table and saddle based on the position information.

8. The milling machine of claim 3 wherein the motor comprises:
    a stepper motor.

9. The milling machine of claim 8 wherein the motor comprises:
    a servo motor.

10. A mill, comprising:
    a base portion having a ram;
    a head assembly having a quill and a rotatable spindle and means to rotate the spindle
    manual control means, coupled to the head assembly, for providing manual control of the quill, the quill having a manual range of motion caused by operation of the manual control means; and
    moveable mounting means for movably mounting the head assembly to the ram to provide automatic relative movement of the head assembly with respect to the base portion to provide an automatic range of motion by operation of the movable mounting means, the manual control means and the movable mounting means being operable to provide an increased range of motion of the spindle during a milling operation, the increased range of motion being greater than the manual range of motion and greater than the automatic range of motion.

11. The mill of claim 10 and further comprising:
    a controller; and
    a motor, coupled to the controller and the moveable mounting means, the controller controlling the motor to drive the moveable mounting means to provide movement of the head assembly with respect to the base portion.

12. The mill of claim 11 wherein the mill is for milling a workpiece, and wherein the base portion comprises:
    a table for providing relative movement of the workpiece with respect to the quill along a first axis;
    a saddle for providing relative movement of the workpiece with respect to the quill along a second axis, and wherein the moveable mounting means provides relative movement of the quill with respect to the workpiece along a third axis.

13. The mill of claim 12 wherein the controller comprises:
   input means for receiving position information.

14. The mill of claim 13 controller controls the motor based on the position information.

15. The mill of claim 13 and further comprising:
   motor means, coupled to the controller, the saddle and the table, the controller controlling the motor means to drive the saddle and the table to provide movement in the first and second axes based on the position information.

16. A knee mill for milling a workpiece, the knee mill comprising:
   a head assembly having a quill and a rotatable spindle and means to rotate the spindle;
   a base and column having a knee, a saddle and a table, the table providing movement of the workpiece along a first axis relative to the head assembly, and the saddle providing movement of the workpiece along a second axis relative to the head assembly;
   a ram extending from an upper portion of the column;
   manual control means, coupled to the head assembly, for providing manual control of relative movement of the spindle with respect to the workpiece along a third axis; and
   automatic moveable mounting means for movably mounting the head assembly to the ram to provide automatic movement of the quill, spindle and head assembly relative to the workpiece along the third axis, the manual control means and the automatic movable mounting means both being independently operable.

17. The knee mill of claim 16 and further comprising:
   a controller, coupled to the automatic moveable mounting means, for receiving position information.

18. The knee mill of claim 17 wherein the automatic moveable mounting means comprises:
   a motor coupled to the controller; and
   moveable connection means, coupled to the motor, for connecting the head assembly to the ram, the controller controlling the motor to drive the moveable connection means to provide relative movement of the quill, spindle and head assembly with respect to the workpiece along the third axis based on the position information.

19. The knee mill of claim 18 and further comprising:
   motor means, coupled to the saddle, the controller and the table, for driving the saddle and table to provide movement along the first and second axes based on the position information.

* * * * *

UNITED STATES PATENT AND TRADEMARK OFFICE
CERTIFICATE OF CORRECTION

PATENT NO. : 5,330,298
DATED : July 19, 1994
INVENTOR(S) : Gary A. Welch, Timothy L. Rashleger It is certified that error appears in the above-indentified patent and that said Letters Patent is hereby corrected as shown below:

Column 8, line 39, after "spindle" insert --;--.

Signed and Sealed this

Twenty-seventh Day of September, 1994

Attest:

BRUCE LEHMAN

Attesting Officer     Commissioner of Patents and Trademarks